(12) United States Patent
Won et al.

(10) Patent No.: US 8,769,064 B2
(45) Date of Patent: Jul. 1, 2014

(54) SYSTEM USING WIRED INTERFACE TO CONFIGURE WIRELESS CONNECTION BETWEEN HOST AND IMAGE FORMING DEVICE

(75) Inventors: Cheol-yon Won, Suwon-si (KR); Byung-woon Oh, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 73 days.

(21) Appl. No.: 13/180,035

(22) Filed: Jul. 11, 2011

(65) Prior Publication Data

US 2012/0151023 A1  Jun. 14, 2012

(30) Foreign Application Priority Data

Dec. 9, 2010  (KR) .................. 10-2010-0125491

(51) Int. Cl.
*G06F 15/177* (2006.01)
(52) U.S. Cl.
USPC ............ 709/222; 709/221; 709/220; 709/228
(58) Field of Classification Search
USPC .............. 370/230.1, 254, 328, 331, 235; 709/220, 237, 224, 222, 221, 228; 726/3; 705/2
See application file for complete search history.

(56) References Cited

U.S. PATENT DOCUMENTS

| | | | |
|---|---|---|---|
| 2009/0067328 A1* | 3/2009 | Morris et al. ............... | 370/230.1 |
| 2010/0180016 A1* | 7/2010 | Bugwadia et al. ............ | 709/220 |
| 2010/0265845 A1* | 10/2010 | Lampen ........................ | 370/254 |
| 2010/0275244 A1* | 10/2010 | Lor et al. ..................... | 726/3 |
| 2011/0002261 A1* | 1/2011 | Mocanu et al. ............... | 370/328 |
| 2011/0013591 A1* | 1/2011 | Kakumaru ..................... | 370/331 |
| 2011/0047289 A1* | 2/2011 | Venkatachalam et al. .... | 709/237 |
| 2011/0119080 A1* | 5/2011 | Hayter et al. ................ | 705/2 |
| 2012/0084430 A1* | 4/2012 | Lu ................................ | 709/224 |
| 2012/0300631 A1* | 11/2012 | Zee et al. ...................... | 370/235 |

FOREIGN PATENT DOCUMENTS

| | | |
|---|---|---|
| EP | 1489502 | 12/2004 |
| EP | 1722514 | 11/2006 |
| JP | 2002-236561 | 8/2002 |
| JP | 2006338358 | 12/2006 |

OTHER PUBLICATIONS

European Search Report Issued on May 3, 2012 in EP Patent Application No. 11172504.0.

* cited by examiner

*Primary Examiner* — Le H Luu
(74) *Attorney, Agent, or Firm* — Stanzione & Kim, LLP (57) ABSTRACT

An image forming device, a host device, and connecting methods thereof are provided. The method includes that when the image forming device is connected to the host device through a wired interface, installing a driver program to execute a wireless connection setting program, determining an internet protocol (IP) setting method of the image forming device according to an IP setting method of the host device, copying network setup information of the host device and transmitting the copied network setup information to the image forming device through the wired interface, and when the image forming device sets an IP address thereof according to the determined IP setting method and transmits the IP address to the host device through the wired interface, establishing a wireless connection setting using the transmitted IP address.

17 Claims, 7 Drawing Sheets

SYSTEM USING WIRED INTERFACE TO CONFIGURE WIRELESS CONNECTION BETWEEN HOST AND IMAGE FORMING DEVICE

CROSS-REFERENCE TO RELATED APPLICATIONS

This application claims priority under 35 U.S.C. §119 from Korean Patent Application No. 10-2010-0125491, filed on Dec. 9, 2010, in the Korean Intellectual Property Office, the disclosure of which is incorporated herein by reference in its entirety.

BACKGROUND OF THE INVENTION

1. Field of the Invention

The present general inventive concept generally relates to an image forming device, a host device, and connecting methods thereof, and more particularly, to an image forming device and a host device which are automatically connected to each other through a wireless network, and connecting methods thereof.

2. Description of the Related Art

The distribution of image forming devices supporting wireless connections has gradually increased with an increase in communication network technology. A user connects a host device to such an image forming device to use the image forming device.

However, how users with no specialized knowledge easily set wireless connections is at issue.

If WiFi Protected Setup (WPS) technology has been used between an access point (AP) and an image forming device to respectively select WPS buttons from the AP and the image forming device within a predetermined time, the AP and the image forming device are automatically connected to each other.

However, the WPS technology provides only a connection to a wireless network environment. In other words, this connection is performed only between the AP and the image forming device. Therefore, after a WPS connection, a user additionally manually sets a printer network address to communicate with the image forming device using the host device. Also, the user additionally changes a personal computer (PC) print port to perform a printing job.

In other words, in order to install a printer, the user manually checks and sets network setup information, including a basic Service Set IDentifier (SSID), an operation mode (e.g., an ad-hoc mode, an infrastructure mode, etc.), an encryption, a network internet protocol (IP) address, etc., one by one.

SUMMARY OF THE INVENTION

Accordingly, technology to easily connect an image forming device to a host device is desirable. The present general inventive concept provides an image forming device and a host device which are automatically connected to each other through a wireless network, and connecting methods thereof.

Additional embodiments of the present general inventive concept will be set forth in part in the description which follows and, in part, will be obvious from the description, or may be learned by practice of the general inventive concept.

Exemplary embodiments of the present general inventive concept may provide a method of connecting a host device to an image forming device, the method including when the image forming device is connected to the host device through a wired interface, installing a driver program to execute a wireless connection setting program, determining an internet protocol (IP) setting method of the image forming device according to an IP setting method of the host device; copying network setup information of the host device and transmitting the copied network setup information to the image forming device through the wired interface, and when the image forming device sets an IP address thereof according to the determined IP setting method and transmits the IP address to the host device through the wired interface, establishing a wireless connection setting using the transmitted IP address.

The determination of the IP setting method may include when the wireless connection setting program is executed, determining whether it is possible for the host device to access a wireless network, when it is determined that it is possible for the host device to access the wireless network, outputting a screen to determine a connection mode as one of an automatic connection mode and a manual connection mode, and when the automatic connection mode is selected, determining an IP setting method of the image forming device as a dynamic host configuration protocol (DHCP) method or an Auto-IP method according to the IP setting method of the host device, when the manual connection mode is selected on the screen, determining the IP setting method of the image forming device as a manual IP inputting method, and outputting a screen to receive a manually input IP address of the image forming device.

The performing of the wireless connection setting may include that when the IP address is transmitted through the wired interface, transmitting a packet internet groper (PING) signal using the transmitted IP address, when a PING response to the PING signal is normally received, automatically setting a port using the IP address, and when there is no PING response to the PING signal, outputting a screen to receive a manually input IP address of the image forming device, and setting a network transmission control protocol-internet protocol (TCP/IP) port of a driver program using the transmitted IP address or the manually input IP address.

The network setup information may include at least one of a Service Set IDentifier (SSID), an operation mode, an encryption, and a Pre-Shared Key (PSK).

Exemplary embodiments of the present general inventive concept may also provide a method of connecting an image forming device to a host device, the method including copying and receiving network setup information from the host device connected to the image forming device through a wired interface, accessing a wireless network according to the received network setup information, determining an IP address according to an IP setting method of the host device; and transmitting the determined IP address to the host device through the wired interface to automatically set a port using the IP address.

When the IP setting method of the host device is a DHCP method, the image forming device may request a DHCP server of the wireless network to allocate an IP address and determine the allocated IP address as an IP address of the image forming device. When the IP setting method of the host device is an Auto-IP method, the image forming device may generate an arbitrary IP address, check whether the generated IP address is usable, through the wireless network, and when the generated IP address is usable, determine the generated IP address as an IP address of the image forming device.

The network setup information may include at least one of an SSID, an operation mode, an encryption, and a PSK.

Exemplary embodiments of the present general inventive concept may also provide a host device which is wirelessly connected to an image forming device, including a wireless communicator to be connected to a wireless network according to pre-set network setup information, a wired communicator to be connected to the image forming device through a wired interface, and a controller to determine an IP setting method of the image forming device according to an IP setting method of the host device, copy the network setup information, and transmit the copied network setup information to the image forming device through the wired communicator, when a wireless connection setting program is executed when the image forming device is connected to the wire communicator, when the image forming device sets an IP address according to the determined IP setting method and transmits the IP address to the host device through the wired interface, the controller may be wirelessly connected to the image forming device using the IP address.

When a recording medium recording a driver program is connected to the host device, the controller may install the driver program to automatically execute a wireless connection setting program.

The host device may further include an output unit to output a connection mode determination screen to determine a connection mode when the wireless connection setting program is executed, and an input unit to select an automatic connection mode or a manual connection mode through the connection mode determination screen.

The controller may control the output unit to determine an IP setting method of the image forming device as a DHCP method or an Auto-IP method according to an IP setting method of the host device when the automatic connection mode is selected on the connection mode determination screen and to determine the IP setting method of the image forming device as a manual IP inputting method and output a screen to receive a manually input IP address of the image forming device when the manual connection mode is selected on the connection mode determination screen.

The controller may control the output unit to transmit a PING signal using the received IP address if the IP address is received through the wired interface, to automatically set a port using the IP address when a PING response to the PING signal is normally received, and to output a screen to receive a manually input IP address of the image forming device when there is no PING response to the PING signal.

The network setup information may include at least one of an SSID, an operation mode, an encryption, and a PSK.

Exemplary embodiments of the present general inventive concept may also be achieved by an image forming device, including a wired interface unit to copy and receive network setup information from a host device connected to the image forming device through a wired interface, a wireless interface unit to access a wireless network according to the network setup information, and a controller to determine an IP address according to an IP setting method of the host device, transmit the determined IP address to the host device through the wired interface, and automatically set a port using the IP address.

The controller may request a DHCP server of a wireless network to allocate an IP address and determine the allocated IP address as an IP address of the image forming device if the IP setting method of the host device is a DHCP method, and may generate an arbitrary IP address, check whether the generated IP address is usable, through the wireless network, and if the generated IP address is usable, determine the generated IP address as an IP address of the image forming device, when the IP setting method of the host device is an Auto-IP method.

The network setup information may include at least one of an SSID, an operation mode, an encryption, and a PSK.

As described above, according to various exemplary embodiments of the present general inventive concept, a user can automatically wirelessly connect a host device and an image forming device to each other without inconvenient controls.

Exemplary embodiments of the present general inventive concept may also provide a method of connecting a host device to an image forming device, where both the host device and image forming device include a wired interface and a wireless interface, the method including when the image forming device is connected to the host device through the wired interface, and the host device is operating in an automatic connection mode, transmitting a copy of the network setup information of the host device to the image forming device through the wired interface, determining an internet protocol (IP) of the host device and transmitting network setup information to the image forming device, receiving the IP address of the image forming device with the host device through the wired interface, and establishing wireless communication between the host device and the image forming apparatus using the received IP address.

The method may include determining whether an IP setting method of the host device is a dynamic host configuration protocol (DHCP) method, and transmitting the network setup information along with information that the IP setting method is a DHCP method from the host device to the image forming apparatus when it is determined that the IP setting method is the DHCP method.

The method may include determining whether an IP setting method of the host device is static, and transmitting an Auto-IP method along with the network setup information to the image forming device from the host device when the IP setting method is static.

The method may include determining whether the IP address normally operates by transmitting a packet internet groper (PING) signal to the IP address and determining with the host whether a PING response to the PING signal is normally received, and setting a network port of the host device when the PING response signal is normally received, where when the PING response signal has been either abnormally received or not received, receiving at least one user-designated wireless communication setting and setting the IP address according to the received at least one setting.

The method may include determining with the host device whether a wireless network connection with the image forming device is possible through the wireless interface, receiving at least one user-designated wireless communication setting when it is determined that the wireless network connection is not possible, and setting the IP address according to the received at least one setting.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
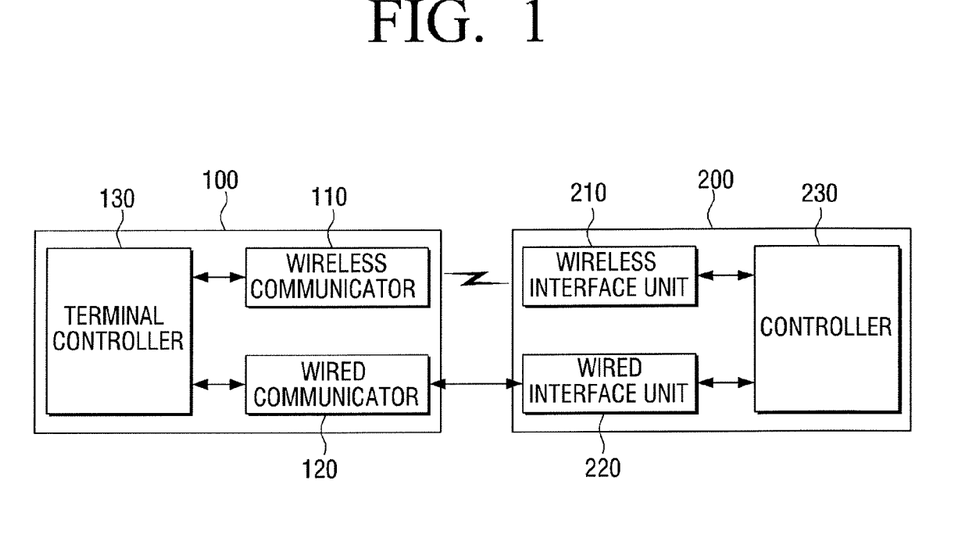
FIG. 1 is a block diagram illustrating a host device and an image forming device according to exemplary embodiments of the present general inventive concept.

FIG. 1 is a block diagram illustrating a host device 100 and an image forming device 200 according to exemplary embodiments of the present general inventive concept. Referring to FIG. 1, the host device 100 can include a wireless communicator 110, a wired communicator 120, and a terminal controller 130. The image forming device 200 can include a wireless interface unit 210, a wired interface unit 220, and a controller 230.

The host device 100 may be one of various types of terminal devices such as a personal computer (PC), a server computer, a set-top computer, a tablet PC, a cellular phone, a personal digital assistant (PDA), an electronic notebook, an electronic book, etc. The image forming device 200 may be one of various types of devices which perform image forming jobs, such as a printer, a scanner, a fax machine, a copier, a multifunction peripheral (MFP), etc.

Data may be transmitted (e.g., according to input received from a user) to the image forming device 200 from the host device 100. The host device 100 can perform an image forming job using the data or may receive data, which is acquired through scanning in the image forming device 200, from the image forming device 200, and store the data. In order to perform an image forming job, a wireless network connection may be formed and/or established between the host device 100 and the image forming device 200. The wireless network connection between the host device 100 and image forming device 200 may be formed and/or established according to an input received from a user or automatically without received user input.

The wireless communicator 110 of the host device 100 can be connected to a wireless network according to pre-stored network setup information. The network setup information refers to information that may be used to form and/or establish the wireless network connection. In more detail, the network setup information may be a Service Set IDentifier (SSID) which is an identifier of a wireless local area network (LAN) service provided from a wireless router, i.e., an access point (AP), an operation mode (e.g., an ad-hoc mode, an infrastructure mode, etc.), an encryption, a Pre-Shared Key (PSK), a network internet protocol (IP) address, or the like.

For a wired network connection, the host device 100 and the image forming device 200 may be connected to each other through a wired interface. That is, a wired communicator 120 of the host device 100 may be connected to a wired interface unit 220 of the image forming apparatus 200 to form a wired communication connection.

The wired communicator 120 of the host device 100 can be connected to the image forming device 200 through the wired interface unit 220. The wired interface unit 220 may be a universal serial bus (USB), an Institute of Electrical and Electronics Engineers (IEEE) 1284 network, an IEEE1394 network, a wire LAN (Local Area Network), or the like. In the preset specification, the descriptions have been given based on the wired interface, but a wireless interface, such as Bluetooth®, radio frequency (RF) communication, or the like, may be applied. In this case, a Bluetooth® communication module, a radio frequency identification (RFID) tag, and a reader unit may be respectively included in the host device 100 and the image forming device 200.

When a wireless connection setting program installed in the host device 100 is executed, the terminal controller 130 can determine an IP (Internet Protocol) setting method of the image forming device 200 according to an IP setting method of the host device 100. The host device 100 may include a storage unit (e.g., the storage unit 160 illustrated in FIG. 2, which may be a memory, a hard disk drive, and/or a solid state drive, etc.) to store the wireless connection setting program which is executed by the host device 100. Examples of an IP setting method may include a manual inputting method, a dynamic host configuration protocol (DHCP) method, an Auto-IP method, etc.

The terminal controller 130 of the host device 100 can determine the IP setting method of the image forming device 200, as well as an IP address. The terminal controller 130 uses the determined IP setting method as the IP setting method of the host device 100 so that the image forming device 200 can be connected to a wireless network using the network setup information of the host device 100.

The DHCP method refers to an IP standard to simplify host IP configuration management. In other words, the DHCP method refers to a method of dynamically receiving an allocation of an IP address which is within a predetermined range to differently allocate the IP address according to situations (e.g., the number of devices to be allocated with an IP address for the network, etc.).

The Auto-IP method refers to a method of generating an IP address in a device, inquiring of peripheral devices about the IP address, and when there are no other devices using the corresponding IP address (i.e., when the IP address is in a usable state), determining that the IP address is to be used.

The terminal controller 130 can control the wired communicator 120 to transmit the IP setting method and the network setup information to the image forming device 200.

When the image forming device 200 determines an IP address using the DHCP method or the Auto-IP method, the terminal controller 130 can receive the IP address through the wired communicator 120. Therefore, the terminal controller 130 can set a network transmission control protocol-internet protocol (TCP/IP) port of a driver program to the received IP address and can end an automatic wireless connection setting process.

In this case, the terminal controller 130 can check whether the received IP address normally operates. For example, the terminal controller 130 may check whether the received IP address normally operates, using a packet Internet groper (PING) signal. PING refers to a command (e.g., a UNIX®/LINUX command) or a network-related program which is used to check whether a specific address responds. The terminal controller 130 can transmit the PING signal to the received IP address and can check whether a PING response to the PING signal has been normally received. Therefore, when the PING response to the PING signal has been normally received, the terminal controller 130 can set a port using the corresponding IP address.

If the PING response to the PING signal has been abnormally received, the terminal controller 130 can discard the corresponding IP address and can repeatedly perform the above-described process or perform a manual connection process. Here, the abnormal reception of the PING response may include where the PING response is not received within a predetermined time or where a signal having a wrong format is received. The manual connection process will be described in more detail later.

When the wireless network connection is completed, the image forming device 200 and the host device 100 can be communicatively connected to each other through the wireless network. The terminal controller 130 can transmit various types of data, commands, etc. to the host device 100 through the wireless communicator 110.

The wired interface unit 220 of the image forming device 200 can copy and receive various types of network setup information which can be pre-set in the host device 100.

The wireless interface unit 210 can access the wireless network according to the received network setup information.

The controller 230 can determine an IP address according to the IP setting method of the host device 100 and can transmit the determined IP address to the host device 100 through the wired interface unit 220. Accordingly, a port can be automatically set using the determined IP address.

In more detail, when the IP setting method of the host device 100 is the DHCP method, the controller 230 can request a DHCP server of the wireless network to allocate an IP address and can determine the allocated IP address as an IP address of the image forming device 200.

When the IP setting method of the host device 100 is the Auto-IP method, the controller 230 can generate an arbitrary IP address. The controller 230 can check whether the generated IP address is usable, through the wireless network. When it is checked that the generated IP address is usable, the controller 230 can determine that the generated IP address as an IP address of the image forming device 200.

When the IP address is determined, the controller 230 can transmit the determined IP address to the host device 100 through the wired interface unit 220.

When the host device 100 transmits the PING signal to the image forming device 200, the controller 230 can respond to the PING signal to verify that a normal wireless communication is possible through the IP address. The controller 230 can be connected to the host device 100 through the wireless network using the corresponding IP address.

The controller 230 can receive various types of data and commands through the wireless interface unit 210 and can perform an image forming job according to the received data and commands. For example, when printing data is transmitted from the host device 100, the controller 230 can convert the printing data into bitmap image data for performing the image forming job and can drive a printing module of the image forming device 200 (not illustrated) to perform a printing job on a printing sheet. Various types of elements to perform the image forming job use a structure of a general image forming device, and thus their illustrations and descriptions will be omitted.

Figure 2:
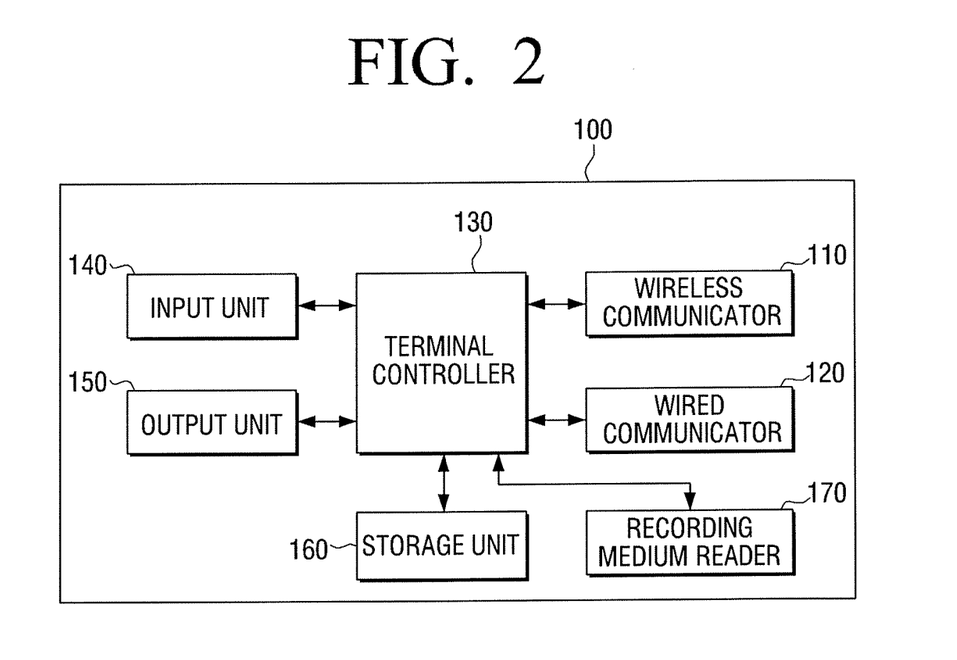
FIG. 2 is a block diagram illustrating the host device of FIG. 1, according to exemplary embodiments of the present general inventive concept.

FIG. 2 is a block diagram illustrating the host device 100 of FIG. 1, according to exemplary embodiments of the present general inventive concept. Referring to FIG. 2, the host device 100 can include the wireless communicator 110, the wired communicator 120, the terminal controller 130, an input unit 140, an output unit 150, a storage unit 160, and a recording medium reader 170.

The input unit 140 can receive various types of commands or information from a user. The user can select and/or execute various types of program execution commands or setup value inputs with the input unit 140. The input unit 140 may be various types of hardware such as a keyboard, a touch pad, a mouse, a joystick, a soft keyboard, or the like.

A driver program installation, a wireless connection setup program execution, etc. may be automatically executed when a recording medium (e.g., a compact disc (CD), a memory card, a USB memory, or the like) storing a driver program is connected to the host device 100.

In other words, when a recording medium is connected to the host device 100, the recording medium reader 170 can read data or a program from the recording medium. In this case, when the recording medium recording the driver program is connected to the host device 100, the recording medium reader 170 can read the driver program from the recording medium and can provide the driver program to the terminal controller 130.

The terminal controller 130 can automatically execute a program to install the driver program so as to install the driver program in the host device 100. A wireless connection setup program can be executed during the automatic installation of the program, thereby automatically achieving a wireless connection to the image forming device 200.

The execution of the wireless connection setup program presupposes that the host device 100 can support a wireless network communication function.

The output unit 150 can output various result screens or user interface screens processed by the host device 100. The output unit 150 may be various types of hardware such as a monitor, a touch screen, a liquid crystal display (LCD) screen, etc. and may be a device (e.g., a television (TV), an electronic frame, or the like) independent of the host device 100.

When the recording medium is connected to the host device 100, the output unit 150 can output a screen to automatically installing the driver program. The output unit 150 changes and outputs the screen according to a process of installing the driver program. The output unit 150 may output a connection mode determination screen to set a connection mode. The user selects one of an automatic connection mode and a manual connection mode on the connection mode determination screen.

When the host device 100 may not be connected to the wireless network, the outputting of the connection mode determination screen may be omitted. When the host device 100 may not be connected to the wireless network may include where a wireless connection adaptor (not illustrated) is not recognized in the host device 100 or where the connection of the host device 100 to the wireless network is temporarily blocked.

When the user selects the manual connection mode or when the host device 100 may not be connected to the wireless network, the host device 100 can manually input an IP address of the image forming device 200 or may set a port to be connected to the image forming device 200.

In other words, when the user selects a next step when wireless setup information of the image forming device 200 is read and output, the output unit 150 can search for a wireless AP or the like around the image forming device 200 using a wireless search function and can display the search result on a list. The user can select an AP, which is to be connected to the image forming device 200, on the list. When the AP is selected, the output unit 150 can display a setup value of the selected AP. Here, the user can manually set a network address, a subnet mask, a gateway, etc., which are to be set in a printer device, according to a network environment. When the user selects a "complete" button after the setting is completed, the wireless network connection can be ended.

When the user selects the automatic connection mode, the terminal controller 130 can determine the IP setting method of the image forming device 200 as the DHCP method or the Auto-IP method according to the IP setting method of the host device 100 as described above. The terminal controller 130 can copy the network setup information, which is used for the wireless network connection by the wireless communicator 110, and transmits the copied network setup information to the image forming device 200 through the wired communicator 120.

The storage unit 160 can store the network setup information, other types of data, and other types of programs. One storage unit 160 is illustrated in FIG. 2, but the number of storage units 160 is not limited, and a position and a type of the storage unit 160 are also not limited. The storage unit 160 may be a memory, flash memory, hard disk drive, or solid state drive, or any other suitable digital storage device. Information such as the network setup information may be stored in a memory of the wireless communicator 110.

The wireless communicator 110 can form the wireless network connection using various communication methods. For example, the wireless communicator 110 may realize the wireless network connection in an ad-hoc mode, an infrastructure mode, or the like.

Figure 3:
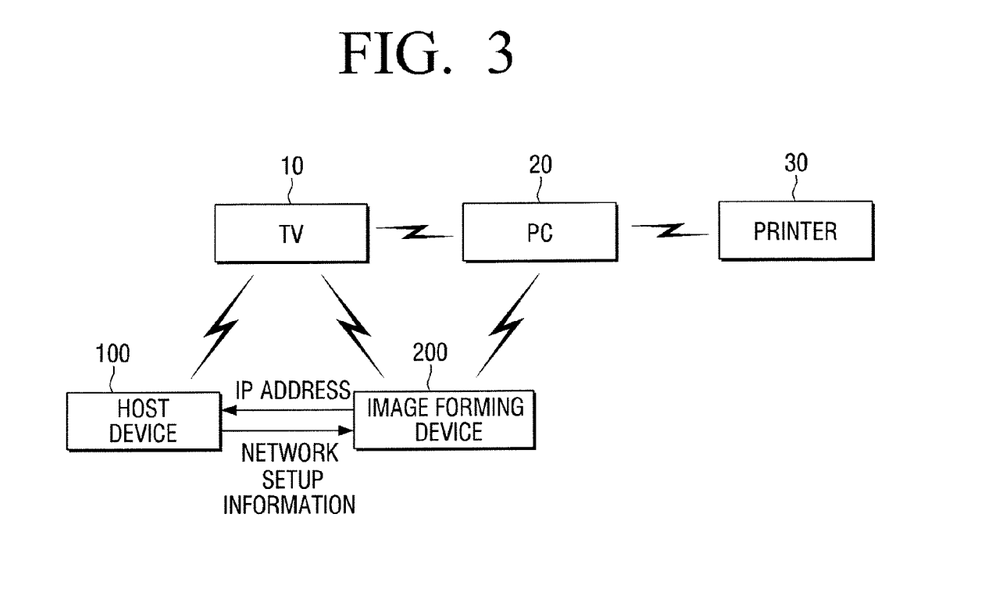
FIG. 3 is a view illustrating a network system connected in an ad-hoc mode according to exemplary embodiments of the present general inventive concept.

FIG. 3 illustrates a network system to operate in an ad-hoc mode according to exemplary embodiments of the present general inventive concept.

Referring to FIG. 3, the host device 100 and the image forming device 200 may be an ad-hoc network, along with other devices 10, 20, and 30. Although FIG. 3 illustrates that devices 1, 20, and 30 can be a television 10, a personal computer (PC) 20, and a printer 30, these are merely examples of other devices in the network. For example, the other devices may be a cell phone, tablet computer, set-top box, server, and/or any other suitable device. The image forming device 200 can access the ad-hoc network using network setup information which is transmitted from the host device 100 to a wired interface (e.g., the wired interface unit 220 of the image forming device 200, as illustrated in FIG. 1 and described above). The network setup information may include an SSID, an operation mode (e.g., an ad-hoc mode, an infrastructure mode, or the like), an encryption, an IP allocation method, a PSK, etc. Here, the SSID may be an SSID generated by a device which has initially established the ad-hoc network.

The image forming device 200 can access the ad-hoc network using the network setup information, can determine an IP address, and can transmit the IP address to the host device 100.

Figure 4:
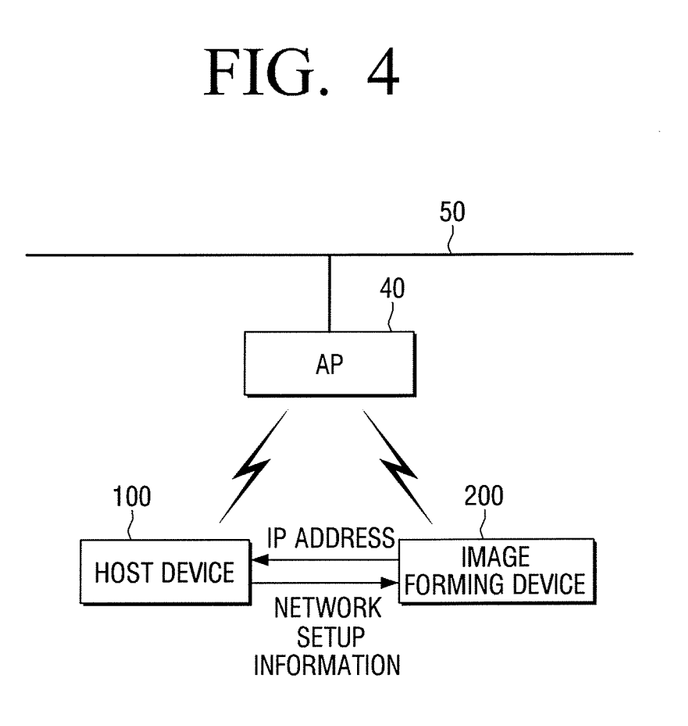
FIG. 4 is a view illustrating a network system connected in an infrastructure mode according to exemplary embodiments of the present general inventive concept.

FIG. 4 is a view illustrating a network system including an infrastructure mode, according to exemplary embodiments of the present general inventive concept. Referring to FIG. 4, an AP 40 can be communicatively connected (e.g., connected via a wireless and/or wired connection) to a network infrastructure 50 and can relay at least wireless communication between the host device 100 and the image forming device 200.

In the network environment as illustrated in FIGS. 3 and 4, the image forming device 200 may broadcast an IP address which can be determined by the image forming device 200. Therefore, other terminal devices that may be communicatively connected to a network can receive the IP address of the image forming device 200 and can access and use the image forming device 200 using the IP address.

Figure 5:
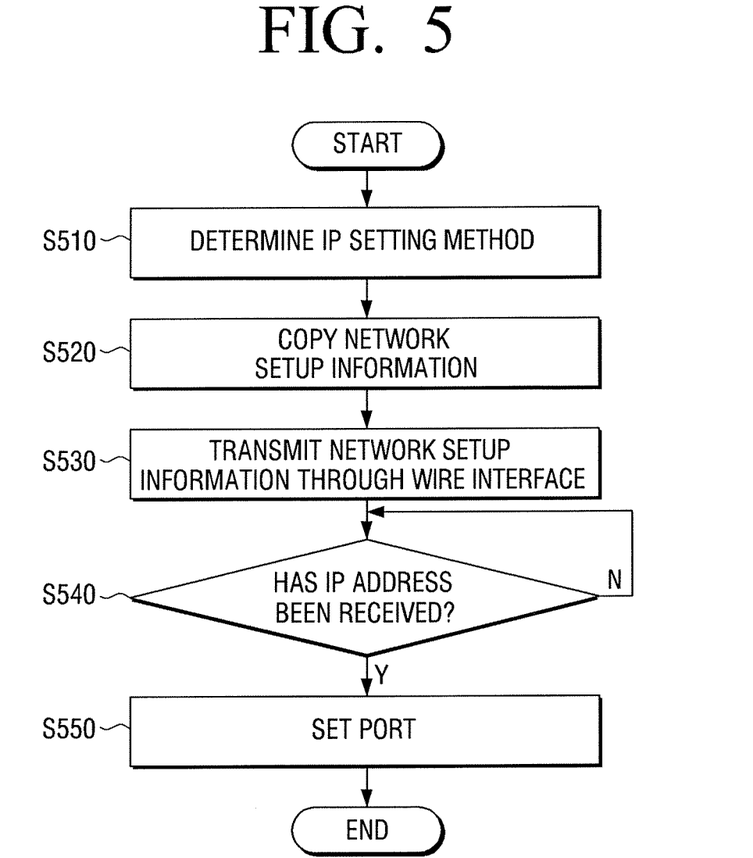
FIGS. 5 and 6 are flowcharts illustrating methods of connecting a host device to an image forming device, according to exemplary embodiments of the present general inventive concept.

FIG. 5 is a flowchart illustrating a method of connecting a host device to an image forming device according to exemplary embodiments of the present general inventive concept.

Referring to FIG. 5, the host device 100 can determine an IP setting method of the image forming device 200 according to an IP setting method thereof at operation S510.

The host device 100 can copy network setup information at operation S520. The host device 100 transmits the copied network setup information to the image forming device 200 through a wired interface at operation S530.

The host device 100 can determine whether an IP address determined by the image forming device 200 has been received through the wired interface at operation S540. When it is determined that the IP address has been received at operation S540-Y, the host device 100 can set a port using the received IP address at operation S550.

Figure 6:
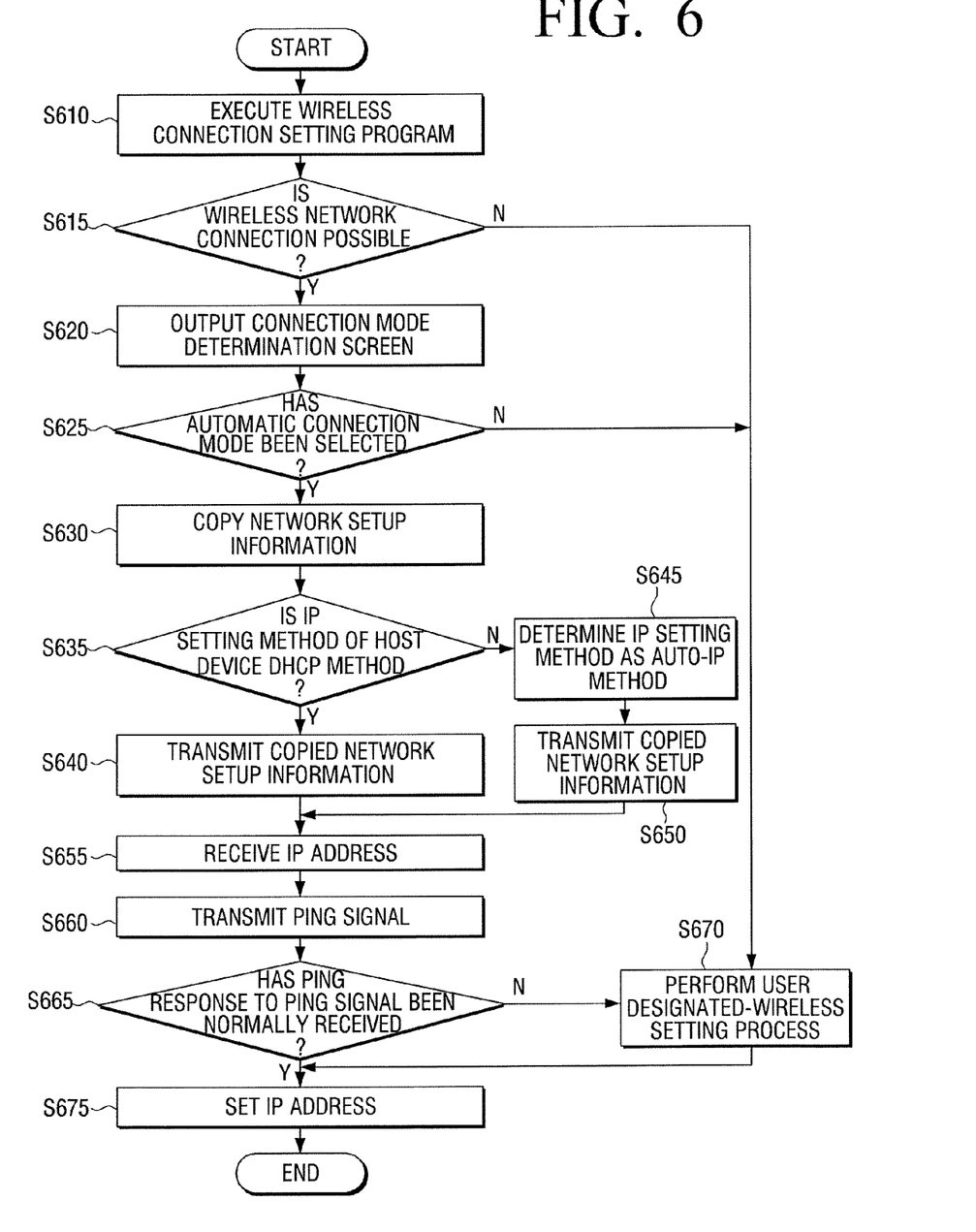

FIG. 6 is a flowchart illustrating detailed operations of a method of connecting a host device to an image forming device according to exemplary embodiments of the present general inventive concept.

Referring to FIG. 6, a driver program installation can execute a wireless connection setting program at operation S610. The host device 100 can determine whether a wireless network connection is possible at operation S615. In other words, the host device 100 can check whether a wireless connection adaptor for performing a wireless network connection is recognized in the host device 100.

When it is determined that the wireless network connection may not be made at operation S615-N, the host device 100 can perform a user-designated wireless setting process to directly input various types of network setup information by the user at operation S670.

When it is determined that the wireless network connection is possible at operation S615-Y, the host device 100 can output a connection mode determination screen at operation S620. The user can select an automatic connection mode or a manual connection mode that are displayed on the connection mode determination screen at operation S625.

When the user selects the manual connection mode, the host device 100 can perform the user-designated wireless setting process at operation S670.

When the user selects the automatic connection mode, the host device 100 can copy network setup information used in the host device 100 at operation S630.

The host device 100 can check an IP setting method thereof and can transmit the network setup information to the image forming device 200 at operations S635, S640, S645, and S650. In other words, the host device 100 can determine whether the IP setting method thereof is a DHCP method at operation S635. When it is determined that the IP setting method is the DHCP method at operation S635-Y, the host device 100 can transmit the network setup information along with information to report that the IP setting method is the DHCP method at operation S640.

When it is determined that the IP setting method of the host device 100 is static, the host device 100 can determine the IP setting method as an Auto-IP method at operation S645. The host device 100 can transmit the Auto-IP method along with the network setup information at operation S650.

The host device 100 can wait for the image forming device 200 to provide data to the host device 100 so that they may communicate and collaboratively operate with one another. The image forming device 200 can be connected to a wireless network using the network setup information provided from the host device 100, can determine an IP address thereof, and can transmit the IP address to the host device 100. In this case, the image forming device 200 can transmit characteristic information of the image forming device 200 which may be used in a driver program, such as a supportable emulation type, a printable resolution type, etc., as option information together.

The host device 100 receives the IP address of the image forming device 200 from the image forming device 200 through a wired interface at operation S655.

In this state, the host device 100 may check whether the IP address normally operates. In other words, the host device 100 can transmit a PING signal to the IP address at operation S660. The host device 100 can determine whether a PING response to the PING signal is normally received at operation S665.

When it is determined that the PING response has been abnormally received or has not been received at operation S665-N, the host device 100 can perform the user designated-wireless setting process at operation S670.

When it is determined that the PING response has been normally received at operation S665-Y, the host device 100 can set a network TCP/IP port of the driver program using the IP address at operation S675. The host device 100 can re-set a device driver based on the option information of the image forming device 200 which is additionally transmitted and ends an automatic wireless connection setting process.

Figure 7:
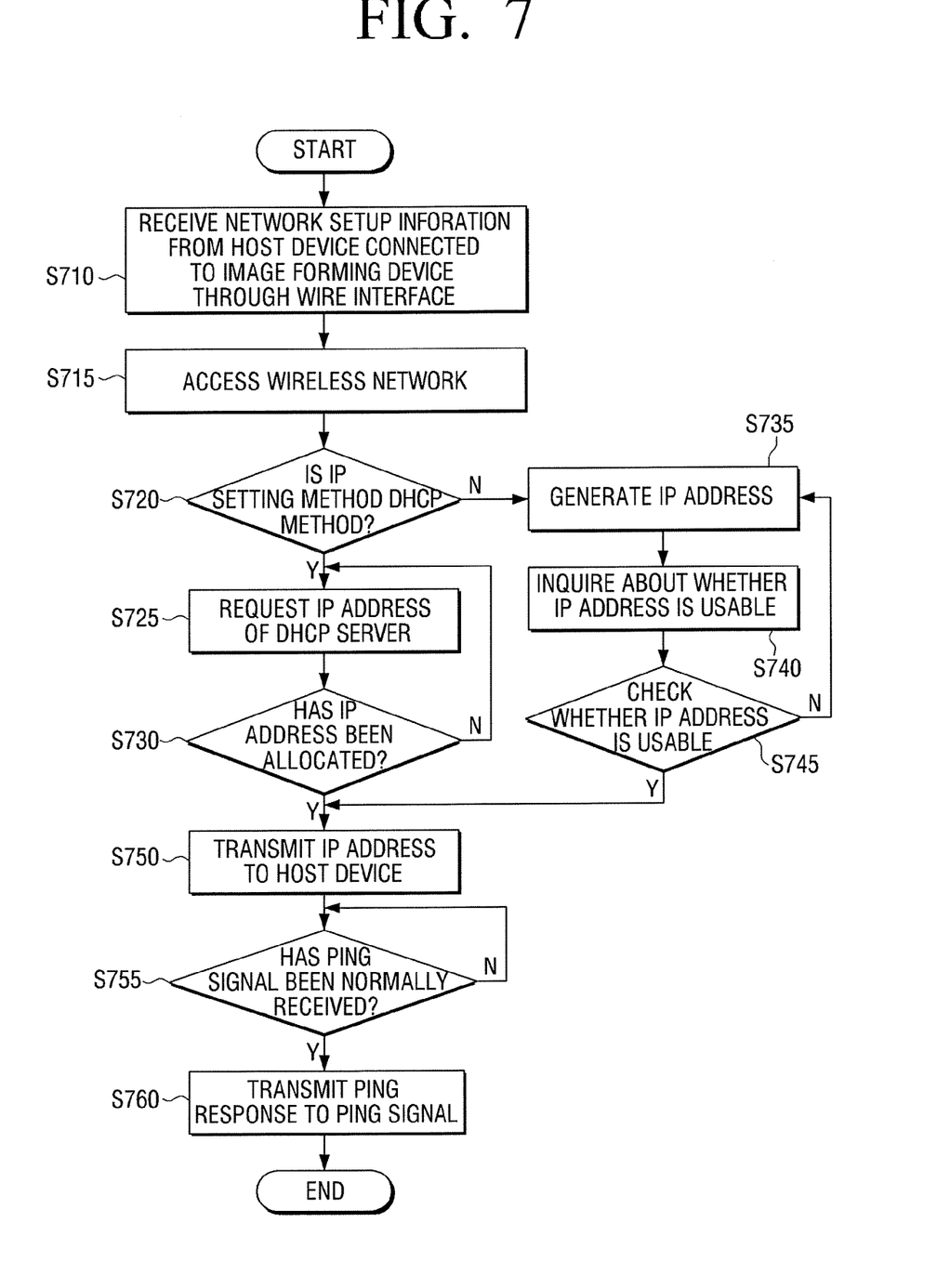
FIG. 7 is a flowchart illustrating a method of connecting an image forming device to a host device according to exemplary embodiments of the present general inventive concept.

FIG. 7 is a flowchart illustrating a method of connecting an image forming device to a host device according to exemplary embodiments of the present general inventive concept. The method illustrated in FIG. 7 may be performed together with the methods illustrated in FIG. 5 or 6, and operations of the method illustrated in FIG. 7 may be performed after operation S530 of FIG. 5 or operations S640 and S650 of FIG. 6.

Referring to FIG. 7, the image forming device 200 can receive network setup information from the host device 100 connected to the image forming device 200 through a wired interface unit 220 at operation S710. The image forming device 200 can access a wireless network using the network setup information at operation S715.

The image forming device 200 can determine whether an IP setting method included in the network setup information is a DHCP method at operation S720. when it is determined that the IP setting method at operation S720-Y is the DHCP method, the image forming device 200 can request an IP address of a DHCP server at operation S725. The image forming device 200 can determine whether an IP address has been allocated from the DHCP server at operation S730. When it is determined that the IP address has been allocated from the DHCP server at operation S730-Y, the image forming device 20 transmits the IP address to the host device 100 at operation S750.

When the IP setting method is not the DHCP method at operation S720-N, the image forming device 200 generates an arbitrary IP address at operation S735. The image forming device 200 can inquire with other terminal devices in the wireless network about whether the generated IP address is usable at operation S740. For example, the image forming device 200 may broadcast a query message including the IP address to inquire about whether the IP address is usable.

The image forming device 200 can determine whether the generated IP address is usable at operation S745. When it is determined that the generated IP address is usable at operation S745-Y, the image forming device 200 can transmit the generated IP address to the host device 100 at operation S750.

The image forming device 200 can determine whether a PING signal has been received from the host device 100 at operation S755. When it is determined that the PING signal has been received from the host device 100 at operation S755-Y, the image forming device 200 transmits a PING response to the PING signal to the host device 100 at operation S760.

The image forming device 200 completes a connection to the host device 100 through these processes.

When the connection to the host device 100 is completed, the image forming device 200 can receive various types of commands or data from the host device 100 through the wireless network and can transmit responses to the commands or data to the host device 100. In other words, the host device 100 can transmit printing data to the image forming device 200 through the wireless network to instruct the image forming device 200 to perform a printing job, regardless of whether the host device is connected to a wired interface.

Connecting methods according to various exemplary embodiments of the present general inventive concept may be program codes and stored on various types of recording media (e.g., stored in the storage unit 160 of the host device 100 illustrated in FIG. 2 and described above). A program for performing the connecting methods, i.e., a wireless setting program, may be included in a driver program to be provided along with the driver program or may be provided separately from the driver program.

These various types of programs may be stored on various types of terminal-readable recording media such as a random access memory (RAM), a flash memory, a read only memory (ROM), an erasable programmable ROM (EPROM), an electronically erasable and programmable ROM (EEPROM), a register, a hard disc, a removable disc, a memory card, a USB memory, a CD-ROM, etc.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A method of connecting a host device to an image forming device, the method comprising:
   when the image forming device is connected to the host device through a wired interface, installing a driver program to execute a wireless connection setting program;
   determining an internet protocol (IP) setting method of the image forming device according to an IP setting method of the host device;

copying network setup information of the host device and transmitting the copied network setup information to the image forming device through the wired interface; and when the image forming device sets an IP address thereof according to the determined IP setting method and transmits the IP address to the host device through the wired interface, establishing a wireless connection setting using the transmitted IP address.

2. The method as claimed in claim 1, wherein the determination of the IP setting method comprises:

when the wireless connection setting program is executed, determining whether it is possible for the host device to access a wireless network;

when it is determined that it is possible for the host device to access the wireless network, outputting a screen to determine a connection mode as one of an automatic connection mode and a manual connection mode; and when the automatic connection mode is selected, determining an IP setting method of the image forming device as a dynamic host configuration protocol (DHCP) method or an Auto-IP method according to the IP setting method of the host device, when the manual connection mode is selected on the screen, determining the IP setting method of the image forming device as a manual IP inputting method, and outputting a screen to receive a manually input IP address of the image forming device.

3. The method as claimed in claim 1, wherein the performing of the wireless connection setting comprises:

when the IP address is transmitted through the wired interface, transmitting a packet internet groper (PING) signal using the transmitted IP address;

when a PING response to the PING signal is normally received, automatically setting a port using the IP address, and when there is no PING response to the PING signal, outputting a screen to receive a manually input IP address of the image forming device; and setting a network transmission control protocol-internet protocol (TCP/IP) port of a driver program using the transmitted IP address or the manually input IP address.

4. The method as claimed in claim 1, wherein the network setup information comprises at least one of a Service Set IDentifier (SSID), an operation mode, an encryption, and a Pre-Shared Key (PSK).

5. A method of connecting an image forming device to a host device, the method comprising:

copying and receiving network setup information from the host device connected to the image forming device through a wired interface;

accessing a wireless network according to the received network setup information;

determining an internet protocol (IP) address according to an IP setting method of the host device; and transmitting the determined IP address to the host device through the wired interface to automatically set a port using the IP address.

6. The method as claimed in claim 5, wherein when the IP setting method of the host device is a DHCP method, the image forming device requests a DHCP server of the wireless network to allocate an IP address and determines the allocated IP address as an IP address of the image forming device, and when the IP setting method of the host device is an Auto-IP method, the image forming device generates an arbitrary IP address, checks whether the generated IP address is usable through the wireless network, and when the generated IP address is usable, determines the generated IP address as an IP address of the image forming device.

7. The method as claimed in claim 5, wherein the network setup information comprises at least one of a Service Set IDentifier (SSID), an operation mode, an encryption, and a Pre-Shared Key (PSK).

8. A host device which is wirelessly connected to an image forming device, comprising:

a wireless communicator to be connected to a wireless network according to pre-set network setup information;

a wired communicator to be connected to the image forming device through a wired interface; and a controller to determine an internet protocol (IP) setting method of the image forming device according to an IP setting method of the host device, copy the network setup information, and transmit the copied network setup information to the image forming device through the wired communicator, when a wireless connection setting program is executed when the image forming device is connected to the wired communicator, wherein when the image forming device sets an IP address according to the determined IP setting method and transmits the IP address to the host device through the wired interface, the controller is wirelessly connected to the image forming device using the IP address.

9. The host device as claimed in claim 8, wherein when a recording medium recording a driver program is connected to the host device, the controller installs the driver program to automatically execute a wireless connection setting program.

10. The host device as claimed in claim 9, further comprising:

an output unit to output a connection mode determination screen to determine a connection mode when the wireless connection setting program is executed; and an input unit to select an automatic connection mode or a manual connection mode through the connection mode determination screen.

11. The host device as claimed in claim 10, wherein the controller controls the output unit to determine an IP setting method of the image forming device as a dynamic host configuration protocol (DHCP) method or an Auto-IP method according to an IP setting method of the host device when the automatic connection mode is selected on the connection mode determination screen and to determine the IP setting method of the image forming device as a manual IP inputting method and output a screen to receive a manually input IP address of the image forming device when the manual connection mode is selected on the connection mode determination screen.

12. The host device as claimed in claim 8, wherein the controller controls the output unit to transmit a packet internet groper (PING) signal using the received IP address when the IP address is received through the wired interface, to automatically set a port using the IP address when a PING response to the PING signal is normally received, and to output a screen to receive a manually input IP address of the image forming device when there is no PING response to the PING signal.

13. The host device as claimed in claim 8, wherein the network setup information comprises at least one of a Service Set IDentifier (SSID), an operation mode, an encryption, and a Pre-Shared Key (PSK).

14. An image forming device, comprising:

a wired interface unit to copy and receive network setup information from a host device connected to the image forming device through a wired interface;

a wireless interface unit to access a wireless network according to the network setup information; and a controller to determine an internet protocol (IP) address according to an IP setting method of the host device, transmit the determined IP address to the host device through the wired interface, and automatically set a port using the IP address.

15. The image forming device as claimed in claim 14, wherein the controller requests a dynamic host configuration protocol (DHCP) server of a wireless network to allocate an IP address and determines the allocated IP address as an IP address of the image forming device when the IP setting method of the host device is a DHCP method, and generates an arbitrary IP address, checks whether the generated IP address is usable, through the wireless network, and when the generated IP address is usable, determines the generated IP address as an IP address of the image forming device, when the IP setting method of the host device is an Auto-IP method.

16. The image forming device as claimed in claim 14, wherein the network setup information comprises at least one of a Service Set IDentifier (SSID), an operation mode, an encryption, and a Pre-Shared Key (PSK).

17. A method of connecting a host device to an image forming device, where both the host device and image forming device include a wired interface and a wireless interface, the method comprising:
- when the image forming device is connected to the host device through the wired interface and a wireless connection setting program has been executed, and the host device is operating in an automatic connection mode, transmitting a copy of the network setup information of the host device to the image forming device through the wired interface;
- determining an internet protocol (IP) address of the image forming device;
- receiving the IP address of the image forming device with the host device through the wired interface; and
- establishing wireless communication between the host device and the image forming apparatus using the received IP address.

* * * * *